United States Patent [19]

Urbansky

[11] Patent Number: 5,537,447
[45] Date of Patent: Jul. 16, 1996

[54] SYNCHRONOUS TRANSMISSION SYSTEM FOR CARRYING MULTIPLEXED SIGNALS

[75] Inventor: Ralph Urbansky, Schwaig, Germany

[73] Assignee: Lucent Technologies Inc., Murray Hill, N.J.

[21] Appl. No.: 287,752

[22] Filed: Aug. 9, 1994

[30] Foreign Application Priority Data

Aug. 10, 1993 [DE] Germany ............... 43 26 771.8

[51] Int. Cl.⁶ ........................... H04L 7/00; H04L 25/36
[52] U.S. Cl. ........................... 375/372; 370/105.3
[58] Field of Search ........................... 375/363, 372, 375/321, 377; 370/102, 105.3, 84

[56] References Cited

U.S. PATENT DOCUMENTS

| | | | |
|---|---|---|---|
| 5,131,013 | 7/1992 | Choi | 375/363 |
| 5,313,502 | 5/1994 | Nawrocki et al. | 375/363 |
| 5,327,430 | 7/1994 | Urbansky | 370/84 |
| 5,343,476 | 8/1994 | Urbansku | 370/102 |
| 5,404,380 | 4/1995 | Powell et al. | 375/363 |

Primary Examiner—Stephen Chin
Assistant Examiner—Tesfaldet Bocure
Attorney, Agent, or Firm—Laurie E. Gathman

[57] ABSTRACT

The invention relates to a transmission system comprising a synchronizer for forming a multiplex signal, comprising at least a device for conveying the multiplex signal, and a desynchronizer. The desynchronizer comprises at least a buffer store for buffering transport unit data contained in the signal, a write address generator for controlling the writing of the data in the buffer store, a control arrangement for forming a control signal for the write address generator from the signal, a read address generator for controlling the reading of the data from the buffer store, a difference circuit for forming difference values between the addresses of write and read address generators and a generating circuit for generating from the difference values a read clock signal applied to the read address generator. The control arrangement is further provided for detecting the offset of at least one transport unit in the signal and for informing a correction circuit of the detected offset, which correction circuit is used for forming the phase difference between a lower-order transport unit and a higher-order transport unit. A combiner circuit is provided for combining a correction value which is the result of the subtraction of the two phase differences and a difference value from the difference circuit.

14 Claims, 4 Drawing Sheets

SYNCHRONOUS TRANSMISSION SYSTEM FOR CARRYING MULTIPLEXED SIGNALS

BACKGROUND OF THE INVENTION

The invention relates to a transmission system comprising a synchronizer for forming a multiplex signal, comprising at least a device for conveying the multiplex signal, and a desynchronizer which comprises at least:

- a buffer store for buffering Transport Unit data contained in the signal;
- a write address generator for controlling the writing of the data in the buffer store;
- a control arrangement for forming a control signal for the write address generator from the signal;
- a read address generator for controlling the reading of the data from the puffer store;
- a difference circuit for forming difference values between the addresses of write and read address generators, and
- a generating circuit for generating from the difference values a read clock signal applied to the read address generator.

Such a transmission system can transmit multiplex signals. A signal transmitted in a plesiochronous transmission system may contain, for example, a plurality of low bit-rate signals contained in one or more high bit-rate signals (for example, 64*2.048 Mbit/s signals in a 139.264 Mbit/s signal). Such low bit-rate signals are mapped into transport units in the frame of the plesiochronous signal. If transmission takes place via digital devices, justification operations are to be carried out owing to clock variations, as a result of which operations various transport units in the frame may be offset.

In a synchronous transmission system, which may be a system of the synchronous digital hierarchy or the American SONET (Synchronous Optical Network) system, the combining, dividing, branching, feeding, or rerouting of any signal burst is made possible. For example, the plesiochronous traffic channel signal streams (in Europe: 2.048 Mbit/s, 34.368 Mbit/s and 139.264 Mbit/s) arriving at a network node of the synchronous digital hierarchy may be prepared with a mapping instruction, so that they are sent to the transmission link in a uniform 125 µs-long synchronous transport frame ($STM_{13}$ 1 frame) as an STM-1 signal at the bit-rate of 155.52 Mbit/s. Such a network node can also receive and process the higher bit-rate STM-N signals (N=4, 16, . . . ) arising from multiplex STM-1 signals.

The STM-1 signal is frame structured and contains control information and justification data in addition to the actual payload of the signal. An STM-1 frame comprises 270 columns and 9 rows (270 bytes per row). The rows 1 to 3 and 5 to 9, in the columns 1 to 9, accommodate the so-termed Section Overhead (SOH) for control and error detection information and the rest of the structure (AU-payload structure=AU payload) accommodates data of the signal, justification data and further control information signals.

The AU-payload may comprise a plurality of different containers (C-4, C-3, C-2, C-12 and C-11). A container is understood to mean the basic unit for carriage of digital payload. For example, an STM-1 frame can accommodate an Administrative Unit AU-4 with a Container C-4 for a bit-rate of 139.264 Mbit/s. Furthermore, three administrative units AU-3 may be accommodated in the STM-1 frame. From these units, for example, an administrative unit AU-3 has a Container C-3 for a bit-rate of 44.736 Mbit/s. The second administrative unit AU-3 may contain, for example, 7 Tributary Unit Groups TUG-2 having each a container C-2 for a bit-rate of 6.312 Mbit/s. The third administrative unit AU-3 may further accommodate 7 TUG-2s having each 3 containers C-12 for a bit-rate of 2.048 Mbit/s. Further transport units (VC-4, VC-3, TU-3, TU-2, TU-12 and TU-11) are formed from the containers by adding control information and justification information.

A synchronous transmission system has generally hierarchically ordered network or system levels (for example, local network level or wide area network level). Each network level comprises synchronous digital units. The clock supply of the individual synchronous digital units is guaranteed by assigned clock supply units. A primary clock supply unit is available with which the secondary clock supply units are to be synchronized. A synchronization may be attained, for example, in that a clock signal is recovered from the STM-1 signal. A recovered clock signal is synchronized with a clock signal of the secondary clock supply unit. This synchronization of the clock signal of the secondary clock supply unit with the STM-1 signal is then impossible if, for example, a private network provider has only a plesiochronous 2.048 Mbit/s signal mapped into the STM-1 signal at his disposal. Then this 2.048 Mbit/s signal is to be used for synchronization purposes.

If a plesiochronous 2.048 Mbit/s signal is transmitted over a plurality of synchronous digital devices, the result will be delay-dependent phase shifts between the synchronizer-formed STM-1 signal having the 2.048 Mbit/s signal, and the STM-1 signal received in a desynchronizer and having the 2.048 Mbit/s signal. Furthermore, buffer-filling-dependent offsets of transport units, which offsets result from frequency and phase variations and cause a change of at least one pointer value and thus also justification operations, are the cause of an additional phase shift of the 2.048 Mbit/s signal. The additional phase shift which is indicated, as observed hereinbefore, by a change of an AU-pointer (if a VC-3 or V-4 is offset) or of a TU-pointer (if a VC-2, VC-12 or VC-11 is offset), is to be taken into account for the desynchronization.

Such a desynchronization may be effected, for example, by the desynchronizer known from EP-A2-0 435 384 (corresponding to U.S. Pat. No. 5,327,430). This desynchronizer comprises at least a buffer store for a plesiochronous signal to be derived from the STM-1 signal. The signals are written in the buffer store by a write address generator (write counter) controlled by a control arrangement (combination of comparator and adder), which write address generator receives a write clock signal from a clock recovery circuit. The signals are read out by a read address generator (read counter) which receives a read clock signal from a combination of final control element, sigma-delta modulator and a controller. The controller is supplied with the difference values between read and write addresses which values are formed in a difference circuit.

It has appeared that if there is a change of the AU-pointer and if a plesiochronous signal used for the synchronization is transmitted in a VC-2, VC-12 or VC-11, it is impossible with a known desynchronizer to take the phase shift indicated in the AU-pointer in the desynchronized plesiochronous signal into account. The same problem occurs if signals are transmitted in a plesiochronous system.

SUMMARY OF THE INVENTION

Therefore, it is an object of the invention to provide a transmission system in which a phase shift not caused by shifts in delay can almost completely be restored in the desynchronized signal.

This object is achieved by a transmission system of the type defined in the opening paragraph, in that the control arrangement is provided for determining the offset of at least one transport unit in the signal and for applying the determined offset to a correction circuit which correction circuit is used for forming the phase difference between a lower-order transport unit and a higher-order transport unit, and in that a combiner circuit is provided for combining a correction value resulting from the subtraction of the two phase differences, and a difference value from the difference circuit.

In the transmission system according to the invention, for example, for transmitting signals of the synchronous digital hierarchy, for example, a phase shift in a higher-order transport unit VC-4 indicated by an AU-pointer value, is taken into account if a lower-order transport unit (for example, transport unit VC-12 or transport unit for a 2.048 Mbit/s signal) is produced, in that a correction value is combined with a difference value from the difference circuit. A higher-order transport unit is meant to be understood as a transport unit containing (lower-order) transport units. The correction value is formed, on the one hand, by the computed phase shift of the lower-order transport unit and, on the other hand, by the computed phase shift of the higher-order transport unit (for example, transport unit VC-4). The phase shift of the lower-order transport unit is then subtracted from the phase shift of the higher-order transport unit. The individual phase shifts are found by an evaluation of the pointer bytes (e.g. taking the TU or AU-pointer values from the pointer bytes). The phase shift may also appear from the evaluation of the justification information in the pointer bytes. The phase shift in transport units of signals in a plesiochronous transmission system appears from the stuff bits. Based on these measures it is possible to realise a clock synchronization between a secondary clock supply unit and a primary clock supply unit by means of a lower-order transport unit (for example, transport unit VC-12 or transport unit for a 2.048 Mbit/s signal) in the synchronous signal (for example, STM-1 signal).

In a further embodiment of the invention, for a synchronous transmission system there is provided that in the correction circuit:

- a computation is made of the average buffer filling level of data of a lower-order transport unit,
- a phase shift of a higher-order transport unit is determined by a multiplication of the dedicated weighted pointer value by the frame duration of the synchronous signal, and by the division by the number of data bytes of the higher-order transport unit in the frame,
- an average phase shift of a lower-order transport unit is determined by a multiplication of the average buffer filling level by the frame duration of the synchronous signal, and the division by the product of the number of data bytes of a frame and the number of bytes of the lower-order transport unit, and
- for forming the correction value, the average phase shift of the lower-order transport unit is subtracted from the phase shift of the higher-order transport unit.

For computing the average buffer filling level for the buffer store for buffering, for example, data bytes of a lower-order transport unit of the 2.048 Mbit/s signal which bytes are mapped into a synchronous signal, the pointer values (for example, AU-4 and TU-12 pointer values) are evaluated. The pointer values point out if, for example, a data byte of a transport unit for the 2.048 Mbit/s signal appears in the synchronous signal (for example, STM-1 signal). After the write and read operations have been simulated in the buffer store, averaged over a frame period, the buffer filling level is found. The average buffer filling level can be used with an STM-1 signal for the lower-order transport units VC-2, VC-12 or VC-11, or with a plesiochronous signal transported in these virtual containers, to form the average phase shift.

The phase shift of a higher-order transport unit VC-4 or VC-3 appears after the dedicated weighted AU-pointer value is multiplied by the STM-1 frame duration (125 µs) and a division is then carried out. The number of data bytes of a higher-order transport unit VC-4 or VC-3 are then divided by the result of the multiplication. The AU-pointer value of an AU-4 is weighted with the value of 3 and of an AU-3 with the value of 1.

The average phase shift of a transport unit VC-2, VC-12, VC-11 or of a plesiochronous signal is computed by multiplying the average buffer filling level by a further factor. The factor is obtained in that the product of the number of data bytes of an STM-1 frame and of the number of data bytes of the transport unit VC-2, VC-12, VC-11, or of the plesiochronous signal is divided by the STM-1 frame duration.

The correction circuit may either perform an updated computation of each correction value or contain a memory Table which is provided for receiving pointer values as addresses and for delivering the stored correction values. If the Table is established, for example, the row periodicity of the STM-1 frame can be taken into account, so that a reduction by a factor of 9 is the result.

As a rule the generating circuit for generating a read clock signal, which circuit comprises at least a controller and a final control element and together with the read address generator and the difference circuit forms a control circuit, is also used for computing the average value of the differences or the signals derived therefrom, respectively. However, if this generating circuit operates with a lower read clock rate (undersampling), an averaging circuit for averaging the difference values over about a frame of the synchronous signal or a multiple thereof should be inserted between difference circuit and combiner circuit to avoid frame structure influences.

The invention likewise relates to a desynchronizer for receiving a plesiochronous or synchronous signal. This desynchronizer comprises at least:

- a buffer store for buffering data of a transport unit carried in the signal,
- a write address generator for controlling the writing of the data in the buffer store,
- a control arrangement for forming a control signal for the write address generator from the signal,
- a read address generator for controlling the reading of the data from the buffer store,
- a difference circuit for forming the difference values from the addresses of write and read address generators, and
- a generating circuit for generating from the difference values a read clock signal applied to the read address generator.

The control arrangement is provided for determining the shift of at least one transport unit in the signal and for applying the determined shift to a correction circuit, which correction circuit is used for forming the phase difference between a lower-order transport unit and a higher-order transport unit. Furthermore, a combiner circuit is provided for combining a correction value which is the result of the subtraction of the two phase differences, and a difference value of the difference circuit.

BRIEF DESCRIPTION OF THE DRAWING

An embodiment of the invention will be further explained in the following with reference to the drawings, in which.

DETAILED DESCRIPTION OF THE PREFERRED EMBODIMENTS

Figure 1:
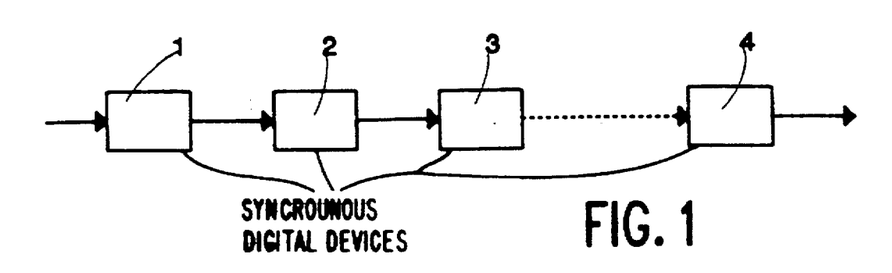
FIG. 1 shows a synchronous transmission system.

FIG. 1 represents a synchronous transmission system comprising a plurality of synchronous digital devices 1 to 4 which process synchronous digital hierarchy signals. For example, the device 1 arranged as a synchronizer is supplied with a plurality of plesiochronous 2.048 Mbit/s signals which are mapped in the synchronizer 1 into an STM-1 signal to be applied to a further synchronous digital device 2. In the synchronizer 1 the bytes of a plesiochronous 2.048 Mbit/s signal are mapped into a virtual container VC-12 (cf. CCITT Recommendation G.709). In addition to the bytes of the 2.048 Mbit/s signal, fixed and variable stuff bytes are inserted. The variable stuff bytes are used for phase or frequency justification. From a virtual container VC-12 is formed a tributary unit TU-12. A TU-12 comprises four additional bytes V1 to V4 as against one VC-12.

Figure 2:
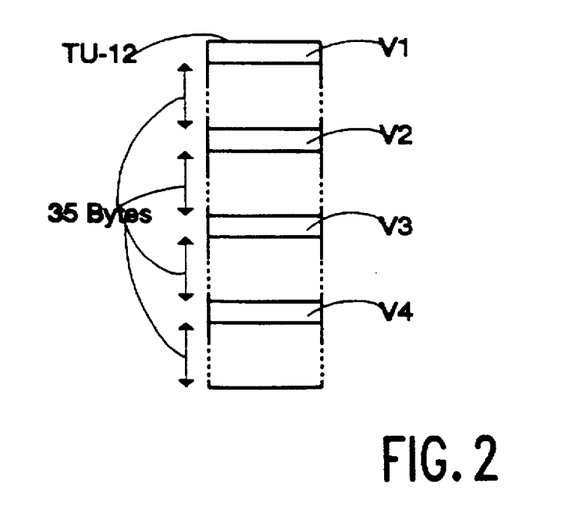
FIG. 2 shows a VC-12 which is formed in a synchronizer of the synchronous transmission system shown in FIG. 1.

FIG. 2 gives a diagrammatic representation of the structure of a VC-12. V-bytes are separated by 35 data bytes. Bytes V1 and V2 contain the pointer value which indicates the beginning of a VC-12. The beginning of a VC-12 in a TU-12 is shown by the V5-byte. The V3-byte makes negative justification possible. A TU-12 is transported in four successive STM-1 frames. Therefore, the duration of a transmission of a TU-12 is 500 µs.

Figure 3:
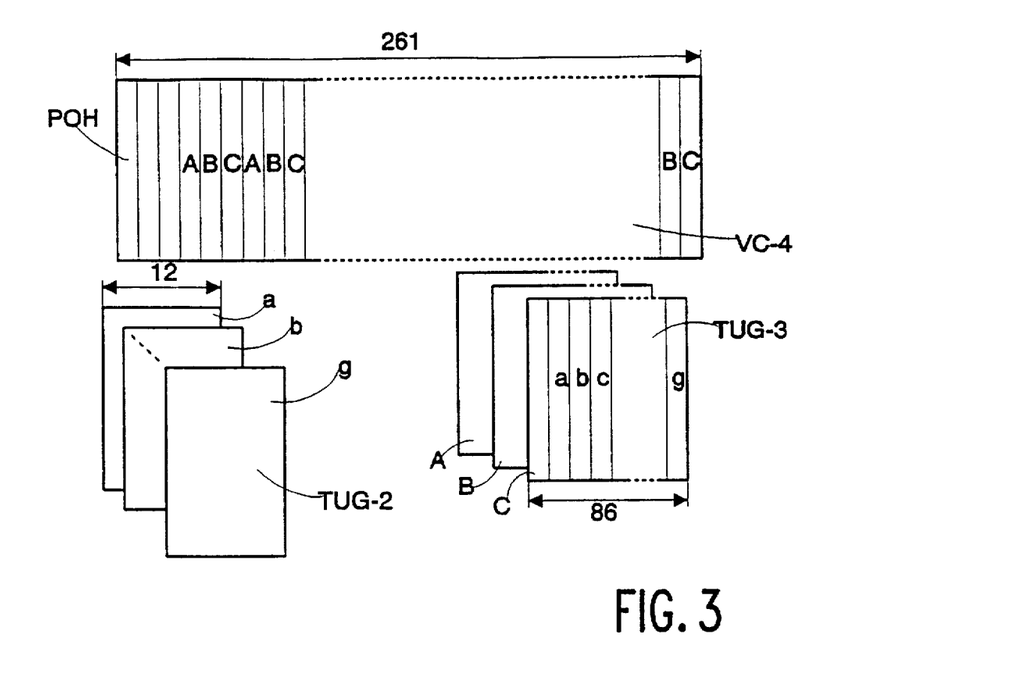
FIG. 3 shows a VC-4 also to be formed in the synchronizer shown in FIG. 1, and the VC-12s to be mapped into the VC-4.

The bytes of a TU-12 are accommodated in columns in a TUG-2. The 4 columns (9 bytes each) of 3 TU-12s are alternately mapped into a TUG-2 and seven TUG-2s are mapped into a VC-3 or a TUG-3. FIG. 3 gives a representation of this mapping. Each TUG-2 contains 12 columns (each column contains 9 bytes) which are also alternately mapped into a TUG-3 or VC-3. A TUG-3, which contains 86 columns (9 bytes each) has fixed stuff bytes in the first column and bytes of transport unit TU-12 in the remaining columns.

As shown in FIG. 3, the bytes of three TUG-3s are mapped into a VC-4. The VC4 contains in the first column a Path Overhead (POH) and in the next two columns fixed stuff bytes. Columns of the 3 TUG-3s are alternately mapped from column 4 onwards.

Figure 4:
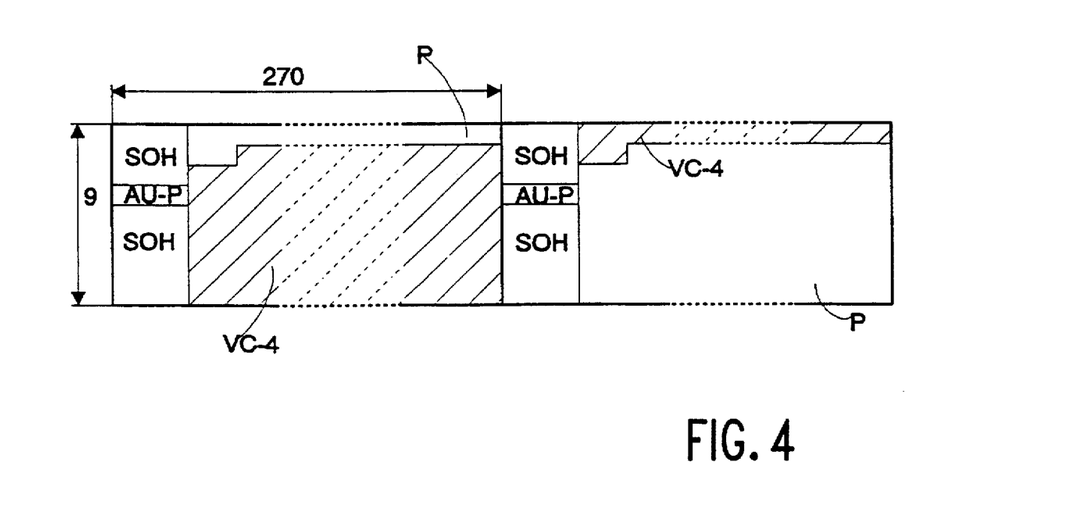
FIG. 4 shows two successive STM-1 frames formed in the synchronizer shown in FIG. 1.

The mapping of a VC-4 into two successive STM-1 frames is outlined in FIG. 4. An STM-1 frame contains 270 columns and 9 rows (270 bytes per row). The rows 1 to 3 and 5 to 9 in the first 9 columns contain the section overhead (SOH) and row 4 contains the AU-pointer (AU-P). Payload, stuff bytes and further bytes for control information signals are mapped into the remaining structure (AU-payload structure=P) in the columns 10 to 270. The AU-Pointer AU-P contains the information about the first bit of a virtual container VC-4 or VC-3, respectively, justification information and further control information.

In the device 2 (FIG. 1) a clock alignment is effected. A justification operation is then carried out, so that the virtual container VC-4 is offset and the AU-pointer value is changed. In the device 3, 2.048 Mbit/s signals can be interleaved and deinterleaved. Here too a clock alignment is effected. If the TU-12 pointer value changes then, this will result in a justification operation (clock alignment) with TU-12 pointer bytes.

In the device 4 arranged as a desynchronizer, a 2.048 Mbit/s signal is now to be recovered. For this purpose, the STM-1 signal is dissolved and a plesiochronous 2.048 Mbit/s signal formed. To indicate the beginning of a virtual container in an administrative unit AU-4 or AU-3 or tributary unit TU-2, TU-12 or TU-11, a pointer value is to be evaluated. It has appeared that certain phase shifts between the original signal and the signal to be recovered cannot be cancelled completely by justification operations if the desynchronizer 4 is structured in a state-of-the-art fashion.

This may be further explained with reference to FIGS. 5 and 6. In each Figure the upper part shows an STM-1 frame formed by the synchronizer 1, which frame contains in one VC-4 63*VC-12s. The first, second, third and fourth columns of the VC-12 are separated by vertical lines. By way of example, TU-pointer bytes (TU-pointers) are also shown. A specific channel or a specific column of a VC-12 is featured by a small line at the top. The desynchronizer 4 receives the STM-1 frames shown at the bottom of the drawing Figures.

Figure 5:
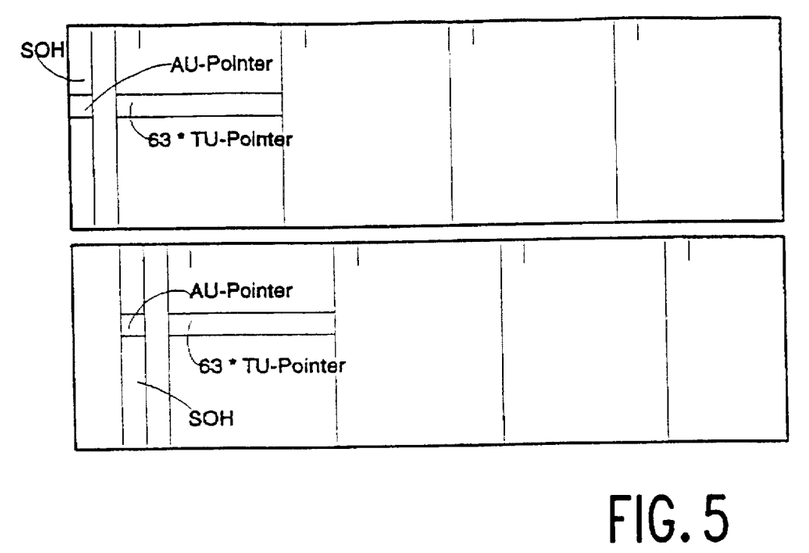
FIGS. 5 and 6 show each STM-1 frames generated in the synchronizer shown in FIG. 1 and each STM-1 frames applied to a desynchronizer of the synchronous transmission system shown in FIG. 1.

The frame received in the desynchronizer 4 and shown in FIG. 5 has only a phase shift of 18 STM-1 bytes with 2430 STM-1 bytes of the STM-1 frame (frame duration: 125 µs) as a result of shifts in delay:

$$\frac{18 \text{ bytes}_{STM-1} * 125 \text{ µs}}{2430 \text{ bytes}_{STM-1}} \approx 0.93 \text{ µs}$$

If the phase shift is related to the VC-12 bytes (35 bytes per STM-1 frame) there is an average phase shift of:

$$\frac{0.26 \text{ bytes}_{VC-12} * 125 \text{ µs}}{35 \text{ bytes}_{VC-12}} \approx 0.93 \text{ µs}$$

with $$\frac{35 \text{ bytes}_{VC-12} * 18 \text{ bytes}_{STM-1}}{2430 \text{ bytes}_{STM-1}} \approx 0.26 \text{ bytes}_{VC-12}$$

The 0.26 byte$_{VC-12}$ represents the average phase shift or the buffer filling level for the transport unit VC-12.

Upon desynchronization, the phase shift would be almost completely reconstructed in this example even if the TU-12 pointer value were changed.

Figure 6:
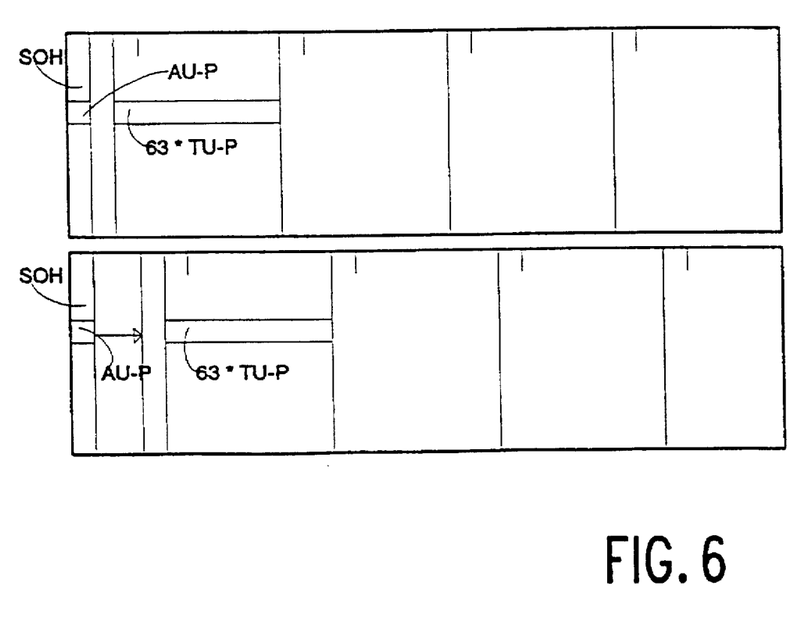

In FIG. 6 the STM-1 signal received in the desynchronizer has the AU-4 pointer value of 6 (18-byte offset). The average phase shift relating to the VC-12 bytes is ≈0.26 VC-12 byte (≈0.93 µs) according to above computation. However, the correct average phase shift is found by relating to the VC-4 bytes. This phase shift is 18 VC-4 bytes:

$$\frac{18 \text{ bytes}_{VC-4} * 125 \text{ μs}}{2349 \text{ bytes}_{VC-4}} \approx 0.96 \text{ μs}$$

In this example, the phase shift is not correctly reconstructed if desynchronization takes place for forming a 2.048 Mbit/s signal. By means of a correction circuit in the desynchronizer 4, the phase shift caused by a modification of a VC-4 or VC-3, which phase shift causes the AU-pointer value to change and thus justification operations to take place, can, however, be almost completely reconstructed.

Figure 7:
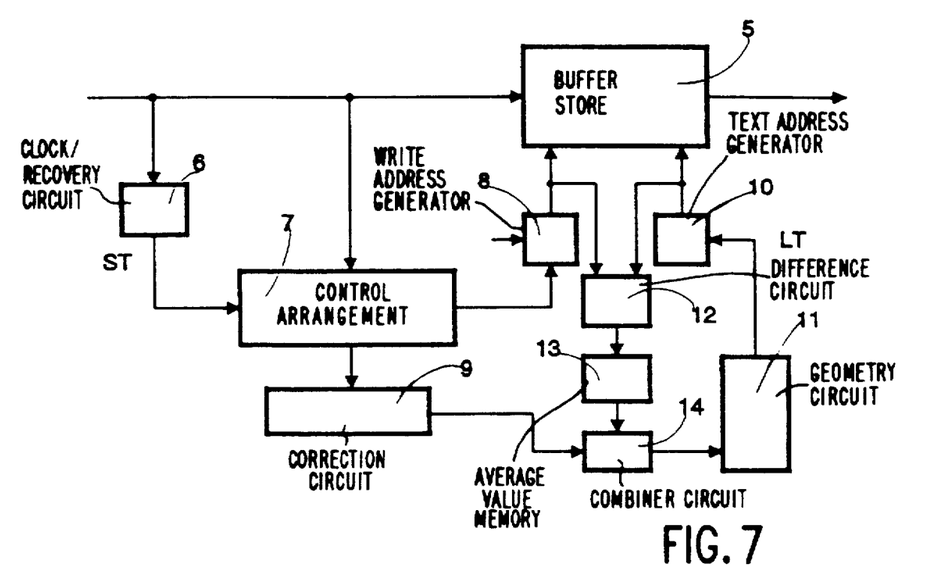
FIG. 7 shows part of a circuit arrangement included in the desynchronizer of the synchronous transmission system shown in FIG. 1.

A part of the desynchronizer 4 is shown in FIG. 7. A buffer store 5 receives, for example, data bytes of a 2.048 Mbit/s signal, whose bytes are mapped into a TU-12. The data bytes of the TU-12 are transported in an STM-1 signal which is applied to the circuit arrangement shown in FIG. 7. From the STM-1 signal is recovered a write clock signal ST having a frequency of about 155.52 MHz by means of a clock recovery circuit 6.

The write clock signal is applied to a control arrangement 7 which comprises comparators and counters, and to a write address generator 8 which may be arranged as a counter. An example of a control arrangement 7 is discussed in EP-A2-0 435 384. In the control arrangement of said European Patent Application there are produced control signals for a counter which is used for writing-in payload bytes for a VC-4. The control arrangement 7 operates similarly to that described in EP-A2-0 435 384 and is used for controlling the writing-in of data bytes of a 2.048 Mbit/s signal by means of a control signal. In addition to the control signal for the write address generator 8, the control arrangement 7 further applies TU-pointer values and AU-pointer values to the correction circuit 9.

The reading of data from the buffer store 5 is controlled by a read address generator 10 arranged as a counter which receives a read clock signal LT at a rate of about 2.048 MHz from a circuit 11 formed by a controller and a final control element. Such a circuit 11 is likewise known from EP-A2-0 435 384. The addresses generated by the write address generator 8 and the read address generator 10 are applied to a difference circuit 12 which forms a difference value which is applied to an average value memory 13. The average value memory 13 averages the difference values over about one STM-1 frame. Values of the correction circuit 9 and of the average value memory 13 are added together in a combiner circuit 14. The combiner circuit 14 applies its values to the circuit 11. The average value memory 13 is necessary only if the circuit 11 operates at a lower read clock rate. In that case averaging takes place in the circuit 11.

The correction circuit 9 may be, for example, a correction Table which corrects the values averaged by the average value memory 13, so that an offset of a VC-4 or VC-3 caused by clock variations in the digital devices 2 and 3 can be corrected. The correction circuit can also recompute the value concerned.

The formation of the correction Table may be effected in the following manner:
AU-4 pointer value: to be set to 0; (0 . . . 782)
TU-pointer value: to be set to 0; (0 . . . 139)
P-buffer: to be set to 0;
As long as the AU-4 pointer value<783 and the TU-12 pointer value< 140:
    set average value to 0;
    perform the following operations for cells 0 to 8:
        perform the following operations for columns 0 to 269:

increment the P-buffer if a P-byte is entered;
            decrement the P-buffer if a P-byte is read out;
            average value:=average value+P-buffer
    end
End.
Incrementation of the AU-4 or TU-12 pointer;
VC-4 phase value:=3 * AU-4 pointer value * 125/2349 μs
P-phase value:=average value * 125/(2430*32)μs
correction value:=VC-4 phase value–P-phase value
End.

The correction Table is to contain a correction value for each occurring AU-4 and TU-12 pointer value. First the buffer filling level of the memory store 5 is simulated. The buffer filling level is indicated as an average value. Then there is a check for each byte in the STM-1 frame whether the byte has been entered and whether a stored byte has been read out. For this check also the TU-pointer value is necessary which indicates the position of the assigned VC-12. The average value is thus formed by adding the most recently formed average value to the contents of the P-buffer. In the P-buffer are entered only bytes of a 2.048 Mbit/s signal.

Once the buffer filling level has been computed, either the AU-4 pointer value or the TU-12 pointer value is incremented. The result of the subtraction between a VC-4 phase value and a P-phase value is used as a correction value. The VC-4 phase value, which denotes the phase shift of the higher-order transport unit VC-4, is formed by a multiplication of three times the AU-4 pointer value by the duration of an STM-1 frame (125 μs) and a division. For this purpose, the number of the VC-4 bytes is divided by the result of the multiplication. The P phase value denotes the average phase shift of the plesiochronous 2.048 Mbit/s signal.

The correction Table may contain a smaller number of correction values if, for example, the row periodicity of the STM-1 frame is taken into account.

If the correction values are computed directly in the correction circuit 9, which in that case is arranged as a processor, the program run is similar to the one described above. However, only the correction value then needs to be computed for the current pointer values.

I claim:

1. Transmission system including a synchronizer for forming a multiplex signal, a device for conveying the multiplex signal, and a desynchronizer which comprises at least:

a buffer store for buffering transport unit data contained in the signal;

a write address generator for controlling the writing of the data in the buffer store;

a control arrangement for forming a control signal for the write address generator from the signal;

a read address generator for controlling the reading of the data from the buffer store;

a difference circuit for forming difference values between the addresses of the write and read address generators,     a generating circuit for generating from a difference signal a read clock signal which is applied to the read address generator,     a correction circuit, and     a combiner circuit, wherein the control arrangement is provided for determining the offset of at least one transport unit in the signal and for applying the determined offset to the correction circuit which correction circuit is used for forming the phase difference between a lower-order transport unit and a higher-order transport unit, and in that the combiner circuit is provided for providing the difference signal to the generating circuit by combining a correction value resulting from the subtraction of the two phase differences, and a difference value from the difference circuit.

2. Synchronous transmission system as claimed in claim 1, characterized in that in the correction circuit:

the computation is made of the average buffer filling level of data of a lower-order transport unit, the phase shift of a higher-order transport unit is determined by a multiplication of the dedicated weighted pointer value by the frame duration of the synchronous signal, and by the division by the number of data bytes of the higher-order transport unit in the frame, an average phase shift of a lower-order transport unit is determined by a multiplication of the average buffer filling level by the frame duration of the synchronous signal, and the division by the product of the number of data bytes of a frame and the number of bytes of the lower-order transport unit, and for forming the correction value, the average phase shift of the lower-order transport unit is subtracted from the phase shift of the higher-order transport unit.

3. Synchronous transmission system for transmitting signals of the synchronous digital hierarchy as claimed in claim 2, characterized in that in the correction circuit:

a computation is made of the average buffer filling level of data bytes of a transport unit VC-2, VC-12, VC-11 or of a plesiochronous signal, a phase shift of a transport unit VC-4 or VC-3 is determined by a multiplication of the weighted AU pointer value by the STM-1 frame duration, and by the division by the number of data bytes of the higher-order transport unit VC-4 or VC-3, the average phase shift of a transport unit VC-2, VC-12, VC-11 or of a plesiochronous signal is determined by a multiplication of the average buffer filling level by the STM-1 frame duration, and by the division by the product of the number of data bytes of an STM-1 frame and the number of data bytes of the transport unit VC-2, VC-12, VC-11 or of the plesiochronous signal, and for forming the correction value, the average phase shift of the transport unit VC-2, VC-12, VC-11 or of the plesiochronous signal is subtracted from the phase shift of the transport unit VC-4 or VC-3.

4. Synchronous transmission system as claimed in claim 3, further comprising an averaging circuit coupled to the difference circuit and the combiner circuit for averaging of the difference values received from the difference circuit over a frame of the synchronous signal and for providing the average to the combiner circuit.

5. Synchronous transmission system as claimed in claim 2, characterized in that the correction circuit contains a memory Table which is provided for receiving pointer values as addresses and for delivering the stored correction values.

6. Synchronous transmission system as claimed in claim 2, further comprising an averaging circuit coupled to the difference circuit and the combiner circuit for averaging of the difference values received from the difference circuit over a frame of the synchronous signal and for providing the average to the combiner circuit.

7. Synchronous transmission system for transmitting signals of the synchronous digital hierarchy as claimed in claim 1, characterized in that in the correction circuit:

a computation is made of the average buffer filling level of data bytes of a transport unit VC-2, VC-12, VC-11 or of a plesiochronous signal, a phase shift of a transport unit VC-4 or VC-3 is determined by a multiplication of the weighted AU pointer value by the STM-1 frame duration, and by the division by the number of data bytes of the higher-order transport unit VC-4 or VC-3, the average phase shift of a transport unit VC-2, VC-12, VC-11 or of a plesiochronous signal is determined by a multiplication of the average buffer filling level by the STM-1 frame duration, and by the division by the product of the number of data bytes of an STM-1 frame and the number of data bytes of the transport unit VC-2, VC-12, VC-11 or of the plesiochronous signal, and for forming the correction value, the average phase shift of the transport unit VC-2, VC-12, VC-11 or of the plesiochronous signal is subtracted from the phase shift of the transport unit VC-4 or VC-3.

8. Synchronous transmission system as claimed in claim 7, characterized in that the correction circuit contains a memory Table which is provided for receiving pointer values as addresses and for delivering the stored correction values.

9. Synchronous transmission system as claimed in claim 8, further comprising an averaging circuit coupled to the difference circuit and the combiner circuit for averaging of the difference values received from the difference circuit over a frame of the synchronous signal and for providing the average to the combiner circuit.

10. Synchronous transmission system as claimed in claim 7, further comprising an averaging circuit coupled to the difference circuit and the combiner circuit for averaging of the difference values received from the difference circuit over a frame of the synchronous signal and for providing the average to the combiner circuit.

11. Synchronous transmission system as claimed claim 1, characterized that in the correction circuit contains a memory Table which is provided for receiving pointer values as addresses and for delivering the stored correction values.

12. Synchronous transmission system as claimed in claim 11, further comprising an averaging circuit coupled to the difference circuit and the combiner circuit for averaging of the difference values received from the difference circuit over a frame of the synchronous signal and for providing the average to the combiner circuit.

13. Synchronous transmission system as claimed in claim 1, further comprising an averaging circuit coupled to the difference circuit and the combiner circuit for averaging of the difference values received from the difference circuit over a frame of the synchronous signal and for providing the average to the combiner circuit.

14. Desynchronizer for receiving a multiplex signal, comprising at least:

a buffer store for buffering transport unit data contained in the signal;

a write address generator for controlling the writing of the data in the buffer store;

a control arrangement for forming a control signal for the write address generator from the signal;

a read address generator for controlling the reading of the data from the buffer store;

a difference circuit for forming difference values between the addresses of write and read address generators;

a generating circuit for generating from a difference signal a read clock signal applied to the read address generator;

a correction circuit; and a combining circuit, wherein the control arrangement is provided for determining the offset of at least one transport unit in the signal and for applying the determined offset to the correction circuit, which correction circuit is used for forming the phase difference between a lower-order transport unit and a higher-order transport unit, and in that the combiner circuit is provided for providing the difference signal to the generating circuit by combining a correction value resulting from the subtraction of the two phase differences and a difference value from the difference circuit.

* * * * *